(12) United States Patent
Kosugi

(10) Patent No.: US 11,669,142 B2
(45) Date of Patent: Jun. 6, 2023

(54) ELECTRONIC APPARATUS AND CONTROL METHOD THAT ACCURATELY DETECT HUMAN FACES

(71) Applicant: Lenovo (Singapore) Pte. Ltd., Singapore (SG)

(72) Inventor: Kazuhiro Kosugi, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/711,511

(22) Filed: Apr. 1, 2022

(65) Prior Publication Data

US 2022/0382359 A1 Dec. 1, 2022

(30) Foreign Application Priority Data

May 31, 2021 (JP) .............................. JP2021-090829

(51) Int. Cl.
*G09G 3/20* (2006.01)
*G06F 1/3231* (2019.01)
(Continued)

(52) U.S. Cl.
CPC .......... *G06F 1/3231* (2013.01); *G06F 1/3265* (2013.01); *G06T 7/70* (2017.01); *G06V 40/166* (2022.01); *G09G 3/20* (2013.01); *G06F 1/1616* (2013.01); *G06F 1/1677* (2013.01); *G06F 1/1686* (2013.01); *G06F 1/3215* (2013.01); *G06F 3/0304* (2013.01); *G06F 21/31* (2013.01);
(Continued)

(58) Field of Classification Search
CPC .... G06F 1/3231; G06F 1/3265; G06F 1/1616; G06F 1/1677; G06F 1/1686; G06F 1/3215; G06F 3/0304; G06F 21/31; G06T 7/70; G06T 2207/30201; G06V 40/166; G06V 40/161; G09G 3/20; G09G 2320/0626; G09G 2354/00; G09G 2358/00; G09G 2320/0261
See application file for complete search history.

(56) References Cited

U.S. PATENT DOCUMENTS

2018/0165437 A1* 6/2018 Shim ...................... G06F 21/32

FOREIGN PATENT DOCUMENTS

| JP | 2007-034515 A | 2/2007 |
| JP | 2016-148895 A | 8/2016 |
| JP | 2021-057721 A | 4/2021 |

* cited by examiner

*Primary Examiner* — Adam J Snyder
(74) *Attorney, Agent, or Firm* — Osha Bergman Watanabe & Burton LLP

(57) ABSTRACT

An electronic apparatus includes a processing unit, a memory, a processor, and an operation control unit. The processing unit executes system processing based on a system. The memory temporarily stores image data of an image captured by an imaging device. The processor processes image data stored in the memory. The operation control unit controls an operating state of the system. The processor includes a face detection unit that processes image data of an image obtained by the imaging device capturing a predetermined imaging range and stored in the memory to perform detection of a face area with a face captured therein and an orientation of the face from the image. The operation control unit controls, according to a detection result by the face detection unit, the operating state of the system to be a first operating state or a second operating state.

11 Claims, 9 Drawing Sheets

(51) Int. Cl.
  *G06V 40/16* (2022.01)
  *G06T 7/70* (2017.01)
  *G06F 1/3234* (2019.01)
  *G06F 1/16* (2006.01)
  *G06F 1/3215* (2019.01)
  *G06F 3/03* (2006.01)
  *G06F 21/31* (2013.01)

(52) U.S. Cl.
  CPC .. *G06T 2207/30201* (2013.01); *G06V 40/161* (2022.01); *G09G 2320/0261* (2013.01); *G09G 2320/0626* (2013.01); *G09G 2354/00* (2013.01); *G09G 2358/00* (2013.01)

ELECTRONIC APPARATUS AND CONTROL METHOD THAT ACCURATELY DETECT HUMAN FACES

CROSS-REFERENCE TO RELATED APPLICATIONS

This application claims priority to Japanese Patent Application No. 2021-90829 filed May 31, 2021, the contents of which are hereby incorporated herein by reference in their entirety.

TECHNICAL FIELD

The present invention relates to an electronic apparatus and a control method.

BACKGROUND

There is an electronic apparatus which makes a transition to a usable state when a person approaches or to a standby state in which functions except some of the functions are stopped when the person leaves. For example, in Japanese Unexamined Patent Application Publication No. 2016-148895, an infrared sensor is used to detect whether a person is approaching or a person goes away.

In recent years, with the development of computer vision and the like, detection accuracy when detecting a face from an image has been getting higher. Therefore, face detection is beginning to be used instead of person detection using the infrared sensor. When using the infrared sensor, infrared light is reflected on and returned from a target regardless of whether the target is a person or any object other than the person, but the use of face detection can prevent just an object from being detected as a person by mistake.

SUMMARY

However, an electronic apparatus is increasingly being used in a public place where persons other than a user come and go such as a cafe, and in such a place, there is a concern that the electronic apparatus will detect a person other than the user and make a transition to the usable state. Further, when the user is using the electronic apparatus for work in the public place, there is a need to be careful about peeping (Shoulder surfing) by any person other than the user. Therefore, there is an electronic apparatus that detects peeping by any person other than the user. Since this peeping detection requires the detection of faces and face orientations of other persons around the user in addition to the detection of a face of the user, power consumption increases because the detection performance is higher.

Embodiments of the present invention provide an electronic apparatus and a control method for detecting a person using the electronic apparatus accurately while ensuring detection performance as needed and reducing power consumption.

One or more embodiments of the present invention include: a processing unit which executes system processing based on a system; a memory which temporarily stores image data of an image captured by an imaging device; a processor which processes image data stored in the memory; and an operation control unit which controls an operating state of the system, wherein the processor includes a face detection unit which processes image data of an image obtained by the imaging device capturing a predetermined imaging range and stored in the memory to perform the detection of a face area with a face captured therein and an orientation of the face from the image, the operation control unit controls, according to the detection result by the face detection unit, the operating state of the system to a first operating state or a second operating state in which at least part of the system processing is more limited than the first operating state, and the face detection unit performs the detection of the face area and the face orientation from a first detection range in an image area of the image in the first operating state, and performs the detection of the face area without performing the detection of the face orientation from a second detection range narrower than the first detection range in the image area of the image in the second operating state.

The above electronic apparatus may also be such that, when the face area is no longer detected from a state where the face area is detected by the face detection unit in the first operating state, the operation control unit makes a transition to the second operating state, while when the face area is detected from a state where the face area is not detected by the face detection unit in the second operating state, the operation control unit makes a transition to the first operating state.

The above electronic apparatus may further be such that, when the face orientation detected in the first operating state is a side profile, the face detection unit stops the detection of the face orientation.

Further, the above electronic apparatus may be such that, when the face orientation detected in the first operating state is a side profile, the face detection unit switches a detection range upon performing the detection of the face to the second detection range.

The above electronic apparatus may further include a display brightness changing unit which, when the face orientation detected by the face detection unit in the first operating state is a side profile, reduces the brightness of a display unit from a set value.

The above electronic apparatus may further include a connection detection unit which detects connection with an external display, wherein when the connection with the external display is detected by the connection detection unit in the first operating state, the face detection unit stops the detection of the face orientation.

The above electronic apparatus may also be such that, when the connection with the external display is detected by the connection detection unit in the first operating state, the face detection unit switches a detection range upon performing the detection of the face to the second detection range.

The above electronic apparatus may further include a display brightness changing unit which, when the connection with the external display is detected by the connection detection unit in the first operating state, reduces the brightness of a display unit from a set value.

Further, the above electronic apparatus may be such that the face detection unit stops the detection of the face orientation based on a user's instruction in the first operating state.

Further, the above electronic apparatus may be such that the face detection unit switches a detection range upon performing the detection of the face to the second detection range based on a user's instruction in the first operating state.

One or more embodiments of the present invention is a control method for an electronic apparatus including a memory which temporarily stores image data of an image captured by an imaging device, and a processor which processes image data stored in the memory, the control method including: a step of causing a processing unit to execute system processing based on a system; a step of causing an operation control unit to control an operating state of the system; and a step of causing a face detection unit in the processor to process image data of an image obtained by the imaging device capturing a predetermined imaging range and stored in the memory in order to detect, from the image, a face area with a face captured therein and an orientation of the face, wherein in the step in which the operation control unit performs control, the operation control unit controls, according to the detection result by the face detection unit, the operating state of the system to a first operating state or a second operating state in which at least part of the system processing is more limited than the first operating state, and in the step performed by the face detection unit, the face detection unit performs the detection of the face area and the face orientation from a first detection range in an image area of the image in the first operating state, and performs the detection of the face area without performing the detection of the face orientation from a second detection range narrower than the first detection range in the image area of the image in the second operating state.

The above-described embodiments of the present invention can detect a person using an electronic apparatus accurately while ensuring detection performance as needed and reducing power consumption.

DETAILED DESCRIPTION

Embodiments of the present invention will be described below with reference to the accompanying drawings.

First Embodiment

[Outline] First, the outline of an electronic apparatus 1 according to a first embodiment will be described. The electronic apparatus 1 according to the present embodiment is, for example, a laptop PC (Personal Computer). Note that the electronic apparatus 1 may also be an electronic apparatus of any other form, such as a desktop PC, a tablet terminal device, or a smartphone.

The electronic apparatus 1 can make a transition at least between a "normal operating state" (first operating state) and a "standby state" (second operating state) as system operating states. The normal operating state is an operating state capable of executing processing without being particularly limited, which corresponds, for example, to S0 state defined in the ACPI (Advanced Configuration and Power Interface) specification. The standby state is a state in which at least part of system processing is limited. For example, the standby state may be the standby state or a sleep state, or a state corresponding to modern standby in Windows (registered trademark) or S3 state (sleep state) defined in the ACPI specification. For example, the standby state is an operating state expected to be lower in power consumption than the normal operating state. Further, a "stopped state" which is further lower in power consumption than the standby state is included in the system operating states. The stopped state is, for example, a hibernation state, a power-off state, or the like. The hibernation state corresponds, for example, to S4 state defined in the ACPI specification. The power-off state corresponds, for example, to S5 state (shutdown state) defined in the ACPI specification.

In the following, a transition of the system operating state from the standby state or the stopped state to the normal operating state may also be called "boot." Since the standby state and the stopped state are lower in activation level than the normal operating state, the boot of the system of the electronic apparatus 1 leads to the activation of the operation of the system in the electronic apparatus 1.

Figure 1A:
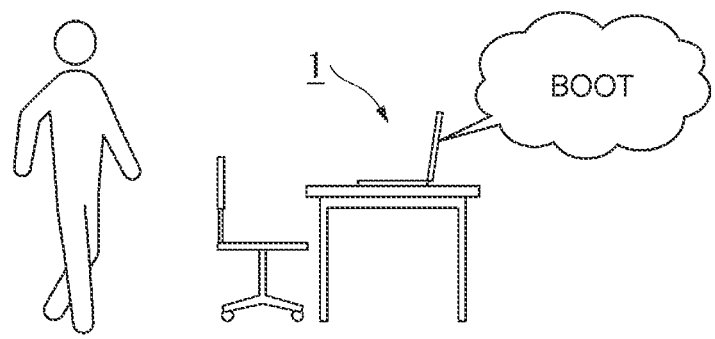
FIGS. 1A, 1B, and 1C are diagrams for describing an outline of HPD processing of an electronic apparatus according to a first embodiment.
Figure 1B:
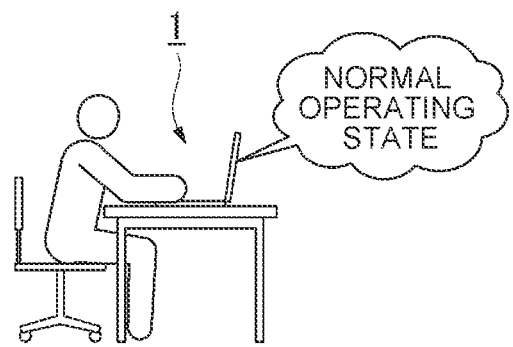
Figure 1C:
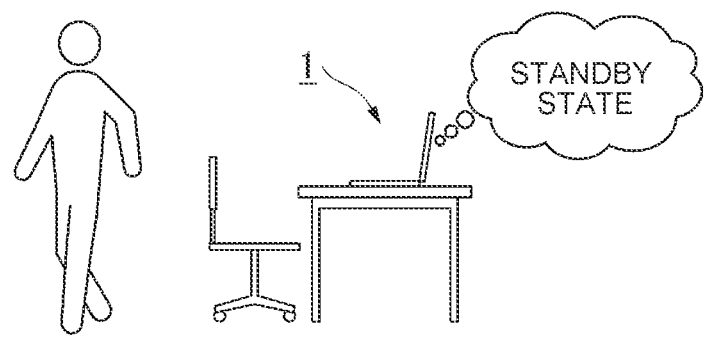

FIG. 1 is a diagram for describing an outline of HPD processing of the electronic apparatus 1 according to the present embodiment. The electronic apparatus 1 detects a person (i.e., a user) present in the neighborhood of the electronic apparatus 1. This processing for detecting the presence of a person is called HPD (Human Presence Detection) processing. The electronic apparatus 1 detects the presence or absence of a person by the HPD processing to control the operating state of the system of the electronic apparatus 1 based on the detection result. For example, as illustrated in FIG. 1A, when detecting a change from a state where no person is present in front of the electronic apparatus 1 (Absence) to a state where a person is present (Presence), that is, when detecting that a person has approached the electronic apparatus 1 (Approach), the electronic apparatus 1 determines that a user has approached and automatically boots the system to make a transition to the normal operating state. Further, in a state where a person is present in front of the electronic apparatus 1 (Presence) as illustrated in FIG. 1B, the electronic apparatus 1 determines that the user is present and continues the normal operating state. Then, as illustrated in FIG. 1C, when detecting a change from the state where the person is present in front of the electronic apparatus 1 (Presence) to the state where no person is present (Absence), that is, when detecting that the person has left the electronic apparatus 1 (Leave), the electronic apparatus 1 determines that the user has left and causes the system to make the transition to the standby state.

For example, the electronic apparatus 1 detects a face area with a face captured therein from a captured image obtained by capturing the front side to determine whether or not the user is present in front of the electronic apparatus 1. When the face area is detected from the captured image, the electronic apparatus 1 determines that the user is present. On the other hand, when no face area is detected from the captured image, the electronic apparatus 1 determines that the user is absent. In other words, when detecting the face area from the captured image from the state where no face area is detected, the electronic apparatus 1 detects that the user has approached the electronic apparatus 1 (Approach), and causes the system to make the transition to the normal operating state. Further, when the face area is no longer detected from the state where the face area is detected from the captured image, the electronic apparatus 1 detects that the user has left the electronic apparatus 1 (Leave), and causes the system to make the transition to the standby state.

By the way, an electronic apparatus is increasingly being used in a public place where persons other than a user come and go such as a cafe. In such a place, any person other than the user may pass by in the neighborhood of the electronic apparatus 1. In this case, there is a concern that electronic apparatus 1 will be booted by detecting a face of the person other than the user. Therefore, in the present embodiment, a detection range upon detecting a face in the standby state is narrowed. This makes it difficult to detect the face of the person other than the user.

Figure 2:
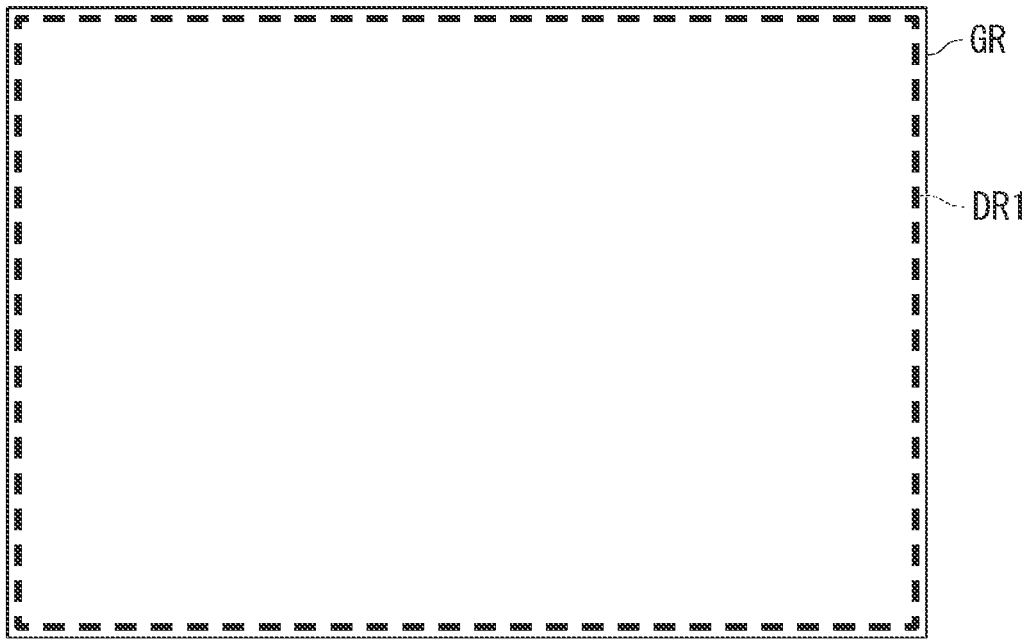
FIG. 2 is a diagram illustrating an example of a face detection range in a normal operating state according to the first embodiment.
Figure 3:
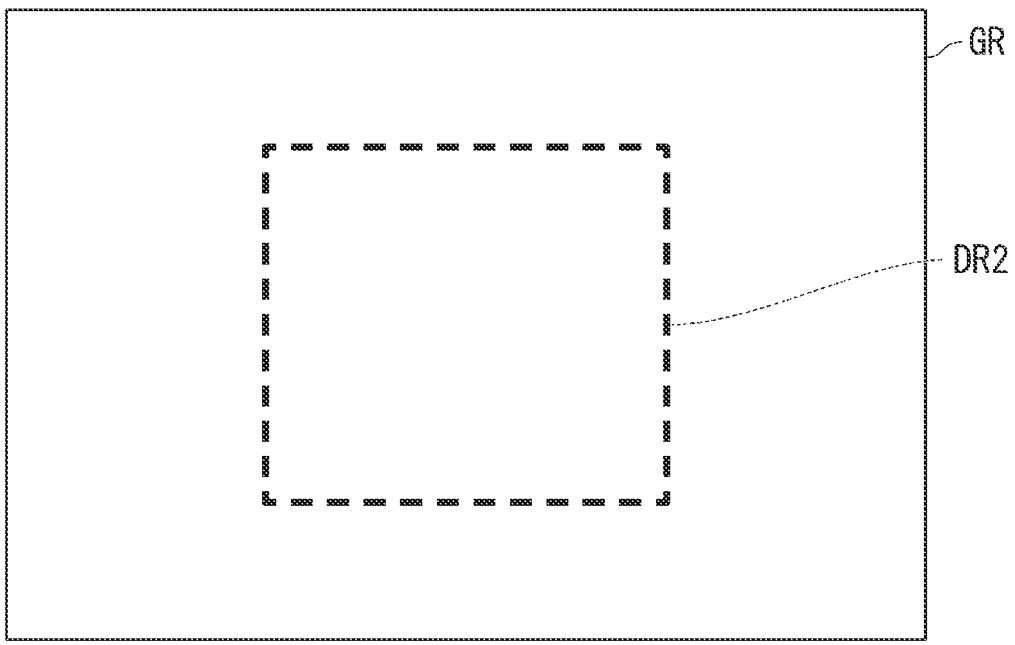
FIG. 3 is a diagram illustrating an example of a face detection range in a standby state according to the first embodiment.

FIG. 2 is a diagram illustrating an example of a face detection range in the normal operating state according to the present embodiment. Further, FIG. 3 is a diagram illustrating an example of a face detection range in the standby state according to the present embodiment. As illustrated, a detection range DR1 upon detecting a face in the normal operating state is set to a full range of an image area of a captured image. In other words, all faces in the captured image become detection targets in the normal operating state. On the other hand, a detection range DR2 upon detecting a face in the standby state is limited to a partial range of the image area of the captured image. For example, the detection range DR2 is set to a range surrounded by a frame with about half width and length in the horizontal direction and the vertical direction from the center of the image area of the captured image. In other words, in the standby state, even when there is a face(s) outside the detection range DR2 of the captured image, the face(s) does not become a detection target(s).

In the following, the face detection range DR1 in the normal operating state is called a "full range." Further, the face detection range DR2 in the standby state is called a "half range." The electronic apparatus 1 performs face detection using the full range in the normal operating state, and performs face detection using the half range in the standby state. Note that the face detection range DR2 in the standby state has only to be set to a range narrower than the face detection range DR1 in the normal operating state, and each range can be set to any size within the image area of the captured image.

Further, for example, when the user is using the electronic apparatus 1 for work in the public place, there is a need to be careful about peeping by a person other than the user. Therefore, the electronic apparatus 1 may also detect a person who is likely to peep (Shoulder surfing). This peeping detection requires the detection of faces and face orientations of other persons around the user in addition to the detection of a face of the user in the normal operating state. Therefore, the electronic apparatus 1 also changes the detection function in addition to the face detection range between the normal operating state and the standby state. Here, a detection mode of HPD processing in the normal operating state is called a "first detection mode," and a detection mode of HPD processing in the standby state is called a "second detection mode."

Figure 4:
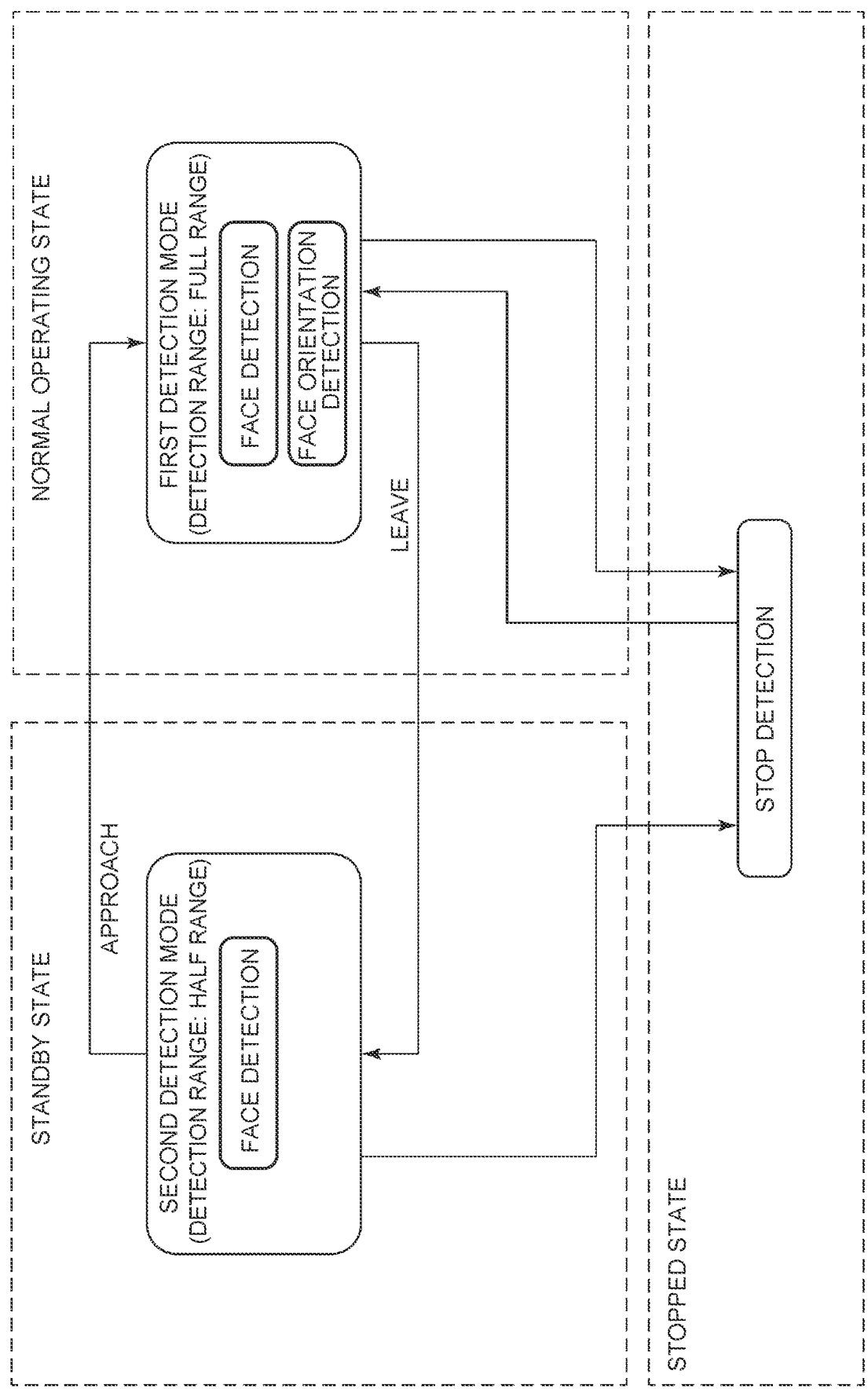
FIG. 4 is a transition diagram illustrating an example of switching between detection modes of HPD processing according to the first embodiment.

FIG. 4 is a transition diagram illustrating an example of switching between detection modes of HPD processing according to the present embodiment. In the standby state, the electronic apparatus 1 performs HPD processing in the second detection mode to detect, in the half range, a face area with a face captured therein from a captured image. Since the standby state is a state where the electronic apparatus 1 is not used by the user, it is expected to reduce power consumption. In this regard, since the detection range in the second detection mode is narrow and the detection of a face orientation is not performed, the second detection mode is suitable because power consumption is lower than the first detection mode. Further, since the detection range is narrowed in the second detection mode, the electronic apparatus 1 can be prevented from being booted by detecting any person other than the user. When a face area is detected from a captured image in the second detection mode from a state where no face area is detected, the electronic apparatus 1 detects that the user has approached the electronic apparatus 1 (Approach), and causes the system to make a transition to the normal operating state.

In the normal operating state, the electronic apparatus 1 performs HPD processing in the first detection mode to perform the detection of a face area and the detection of a face orientation from a captured image in the full range. In the first detection mode, since the electronic apparatus 1 performs the detection of a face area and the detection of a face orientation in the full range, any person other than the user, who is likely to peep (Shoulder surfing), can be detected because detection performance is high. When a face area is no longer detected from a state where the face area is detected from the captured image in the first detection mode, the electronic apparatus 1 detects that the user has left the electronic apparatus 1 (Leave), and causes the system to make a transition to the standby state.

Further, in both the standby state and the normal operating state, the electronic apparatus 1 makes a transition to the stopped state by an instruction to turn off the power (Power off), by an instruction to make a transition to the hibernation state, or by closing the electronic apparatus 1 (laptop PC). In the stopped state, detection by the HPD processing is stopped. Further, the electronic apparatus 1 makes a transition to the normal operating state by an instruction to turn on the power (Power on) from the stopped state or by opening the electronic apparatus 1 (laptop PC).

Next, the configuration of the electronic apparatus 1 according to the present embodiment will be described in detail.

[Appearance Configuration of Electronic Apparatus]

Figure 5:
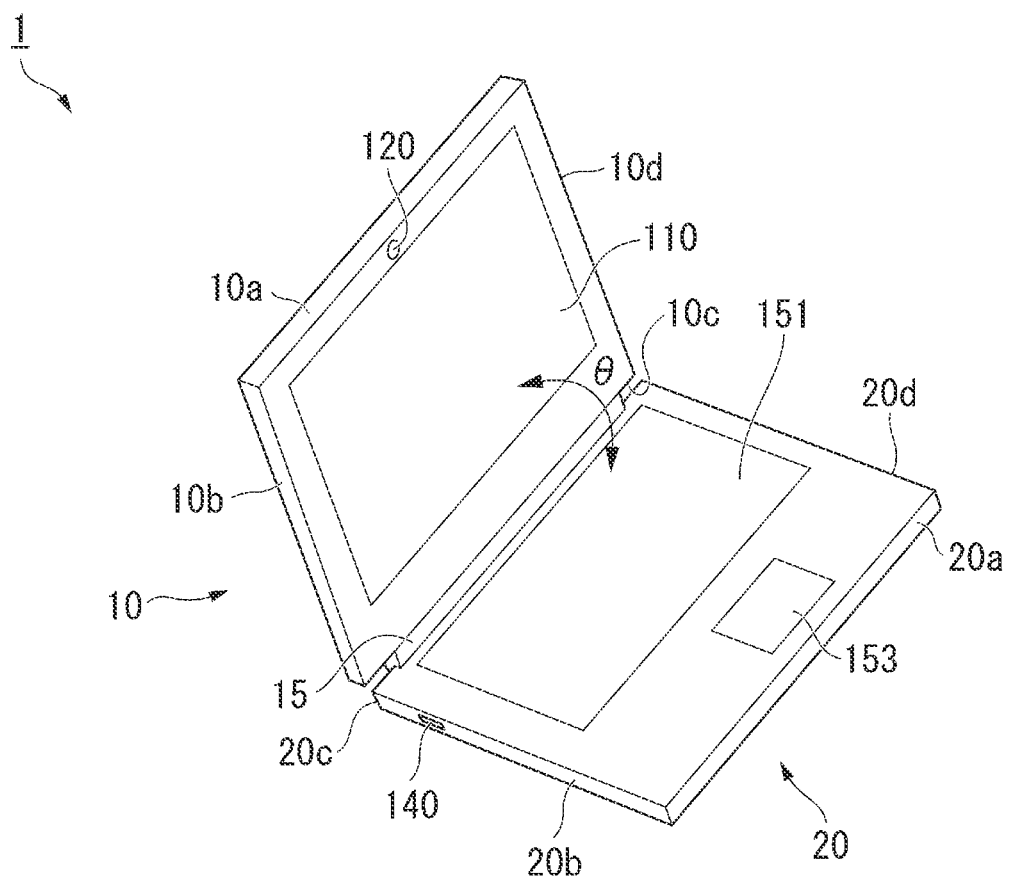
FIG. 5 is a perspective view illustrating an appearance configuration example of the electronic apparatus according to the first embodiment.

FIG. 5 is a perspective view illustrating an appearance configuration example of the electronic apparatus 1 according to the present embodiment.

The electronic apparatus 1 includes a first chassis 10, a second chassis 20, and a hinge mechanism 15. The first chassis 10 and the second chassis 20 are coupled by using the hinge mechanism 15. The first chassis 10 is rotatable around an axis of rotation formed by the hinge mechanism 15 relative to the second chassis 20. An open angle by the rotation between the first chassis 10 and the second chassis 20 is denoted by "θ."

The first chassis 10 is also called A cover or a display chassis. The second chassis 20 is also called C cover or a system chassis. In the following description, side faces on which the hinge mechanism 15 is provided among side faces of the first chassis 10 and the second chassis 20 are referred to as the side faces 10c and 20c, respectively. Among the side faces of the first chassis 10 and the second chassis 20, faces opposite to the side faces 10c and 20c are referred to as side faces 10a and 20a, respectively. In this figure, the direction from the side face 20a toward the side face 20c is referred to as "rear," and the direction from the side face 20c to the side face 20a is referred to as "front." The right hand and left hand in the rearward direction are referred to as "right" and "left," respectively. Left side faces of the first chassis 10 and the second chassis 20 are referred to as side faces 10b and 20b, respectively, and right side faces thereof are referred to as side faces 10d and 20d, respectively. Further, a state where the first chassis 10 and the second chassis 20 overlap each other and are completely closed (a state of open angle θ=0°) is referred to as a "closed state." The faces of the first chassis 10 and the second chassis 20 on the face-to-face sides in the closed state are referred to as respective "inner faces," and the faces opposite to the inner faces are referred to as "outer faces." Further, a state opposite to the closed state, where the first chassis 10 and the second chassis 20 are open, is referred to as an "open state."

The appearance of the electronic apparatus 1 in FIG. 5 illustrates an example of the open state. The open state is a state where the side face 10a of the first chassis 10 and the side face 20a of the second chassis 20 are separated. In the open state, the respective inner faces of the first chassis 10 and the second chassis 20 appear. The open state is one of states when the user uses the electronic apparatus 1, and the electronic apparatus 1 is often used in a state where the open angle is typically about θ=100° to 130°. Note that the range of open angles θ to be the open state can be set arbitrarily according to the range of angles rotatable by the hinge mechanism 15 or the like.

A display unit 110 is provided on the inner face of the first chassis 10. The display unit 110 is configured to include a liquid crystal display (LCD) or an organic EL (Electro Luminescence) display, and the like. Further, an imaging unit 120 is provided in a peripheral area of the display unit 110 on the inner face of the first chassis 10. For example, the imaging unit 120 is arranged on the side of the side face 10a in the peripheral area of the display unit 110. Note that the position at which the imaging unit 120 is arranged is just an example, and it may be elsewhere as long as the imaging unit 120 can face a direction (frontward) to face the inner face of the first chassis 10.

In the open state, the imaging unit 120 captures a predetermined imaging range in the direction (frontward) to face the inner face of the first chassis 10. The predetermined imaging range is a range of angle of view defined by an image sensor included in the imaging unit 120 and an optical lens provided in front of the imaging surface of the image sensor. For example, the imaging unit 120 can capture images including a person present in front of the electronic apparatus 1.

Further, a power button 140 is provided on the side face 20b of the second chassis 20. The power button 140 is an operating element used by the user to give instructions to power on (transition from the stopped state to the normal operating state) and to power off (transition from the normal operating state to the stopped state). Further, a keyboard 151 and a touch pad 153 are provided as an input device on the inner face of the second chassis 20. Note that a touch sensor may also be included as the input device instead of or in addition to the keyboard 151 and the touch pad 153, or a mouse and an external keyboard may be connected. When the touch sensor is provided, an area corresponding to the display surface of the display unit 110 may be constructed as a touch panel for accepting operations. Further, a microphone used to input voice may be included in the input device.

In the closed state where the first chassis 10 and the second chassis 20 are closed, the display unit 110 and the imaging unit 120 provided on the inner face of the first chassis 10, and the keyboard 151 and the touch pad 153 provided on the inner face of the second chassis 20 are covered with each other's chassis faces, respectively, and put in a state of being disabled from fulfilling the functions thereof.

[Configuration of Electronic Apparatus]

Figure 6:
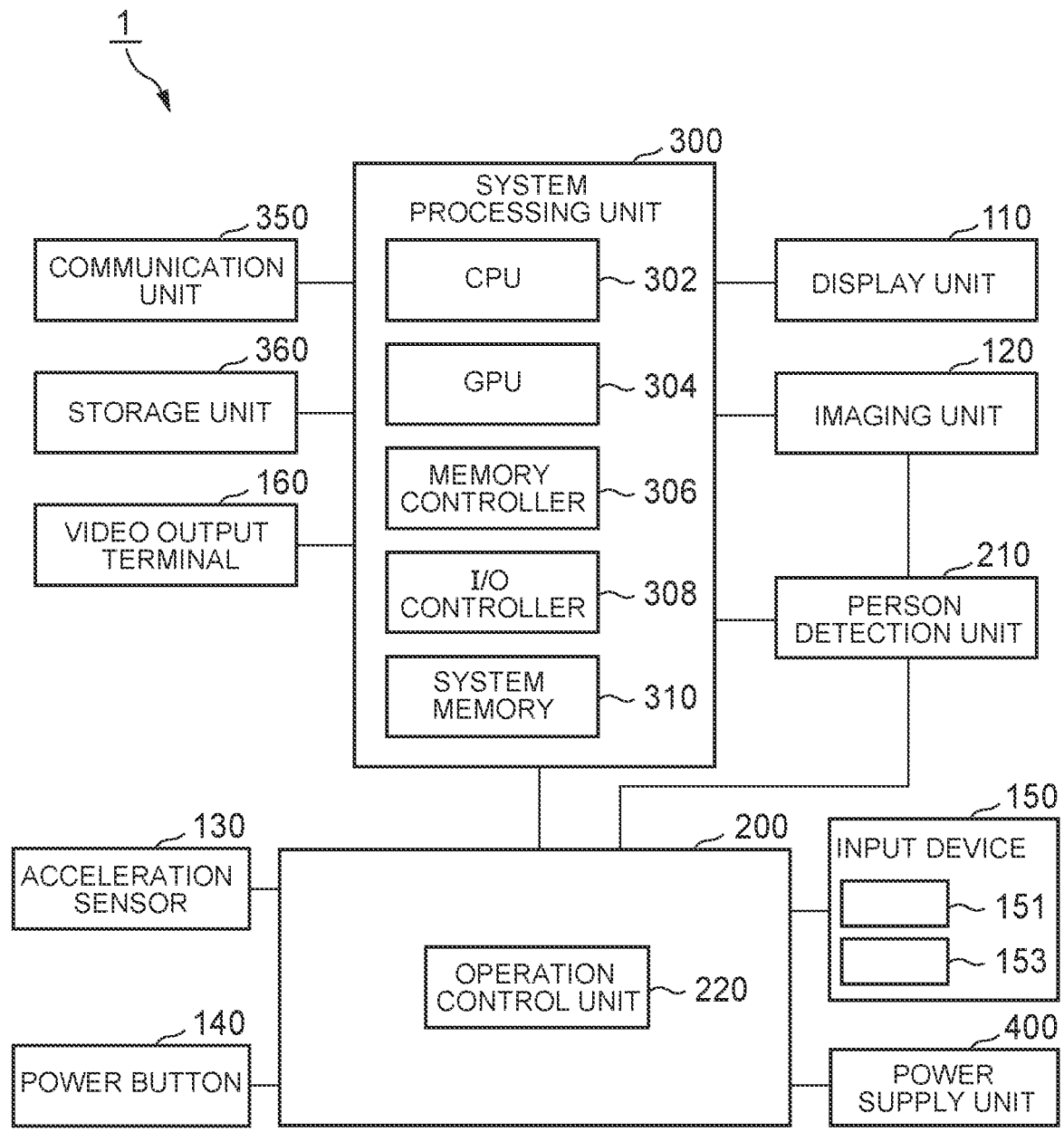
FIG. 6 is a block diagram illustrating a configuration example of the electronic apparatus according to the first embodiment.

FIG. 6 is a block diagram illustrating a configuration example of the electronic apparatus 1 according to the present embodiment. The electronic apparatus 1 is configured to include the display unit 110, the imaging unit 120, an acceleration sensor 130, the power button 140, an input device 150, a video output terminal 160, an EC (Embedded Controller) 200, a person detection unit 210, a system processing unit 300, a communication unit 350, a storage unit 360, and a power supply unit 400. The display unit 110 displays display data (images) generated based on system processing executed by the system processing unit 300, processing of an application program running in the system processing, and the like.

The imaging unit 120 captures an image of an object within a predetermined angle of view in a direction (frontward) to face the inner face of the first chassis 10, and outputs the captured image to the system processing unit 300 and the person detection unit 210. The imaging unit 120 may be an infrared camera or a normal camera. The infrared camera is a camera including an infrared sensor as an image sensor. The normal camera is a camera including, as an image sensor, a visible light sensor for receiving a visible light beam (for example, an RGB camera). In the case of the normal camera, a captured image used for face detection may also be an image with a reduced number of colors (for example, a monochrome image).

The acceleration sensor 130 detects the movement of the electronic apparatus 1 and outputs, to the EC 200, a detection signal indicative of the detection result. For example, when the electronic apparatus 1 is moved or the electronic apparatus 1 is moving unstably by being hand-held, the acceleration sensor 130 outputs a detection signal according to the movement. Note that a gyro sensor, a tilt sensor, a geomagnetic sensor, and the like may also be included instead of or in addition to the acceleration sensor 130.

The power button 140 outputs, to the EC 200, operation signals according to user's operations. The input device 150 is an input unit for accepting user's input, which is configured to include, for example, the keyboard 151 and the touch pad 153. In response to accepting operations on the keyboard 151 and the touch pad 153, the input device 150 outputs, to the EC 200, operation signals indicative of the content of the operations.

The video output terminal 160 is a connection terminal to connect to an external display (display device). For example, the video output terminal 160 is an HDMI (registered trademark) terminal, a USB Type-C terminal, a display port, or the like.

The power supply unit 400 supplies power through a power system for supplying power to each unit of the electronic apparatus 1 according to the operating state of each unit of the electronic apparatus 1. The power supply unit 400 includes a DC (Direct Current)/DC converter. The DC/DC converter converts the voltage of DC power, supplied from an AC (Alternate Current)/DC adapter or a battery pack, to a voltage required for each unit. The power with the voltage converted by the DC/DC converter is supplied to each unit through each power system. For example, the power supply unit 400 supplies power to each unit through each power system based on a control signal according to the operating state of each unit input from the EC 200.

The EC 200 is a microcomputer configured to include a CPU (Central Processing Unit), a RAM (Random Access Memory), a ROM (Read Only Memory), an I/O (Input/Output) logic circuit, and the like. The CPU of the EC 200 reads a control program (firmware) prestored in the ROM thereof and executes the read control program to fulfill the function. The EC 200 operates independently of the system processing unit 300 to control the operation of the system processing unit 300 and manage the operating state of the system processing unit 300. Further, the EC 200 is connected to the acceleration sensor 130, the power button 140, the input device 150, the person detection unit 210, the power supply unit 400, and the like.

For example, the EC 200 communicates with the power supply unit 400 to acquire information on a battery state (remaining battery capacity, and the like) from the power supply unit 400 and to output, to the power supply unit 400, a control signal or the like in order to control the supply of power according to the operating state of each unit of the electronic apparatus 1. Further, the EC 200 acquires operation signals from the power button 140 and the input device 150, and outputs, to the system processing unit 300, an operation signal related to processing of the system processing unit 300 among the acquired operation signals. Further, the EC 200 detects the movement of the electronic apparatus 1 based on the detection signal from the acceleration sensor 130. For example, based on the detection signal from the acceleration sensor 130, the EC 200 detects whether the electronic apparatus 1 is in a stationary state or a moving state. Further, the EC 200 includes an operation control unit 220 to control the operation of the system based on a detection result by the person detection unit 210.

The person detection unit 210 is a processor for processing image data of a captured image captured by the imaging unit 120. For example, the person detection unit 210 acquires the captured image captured by the imaging unit 120 through the system processing unit 300. Note that the person detection unit 210 may also acquire the captured image captured by the imaging unit 120 directly from the imaging unit 120. The person detection unit 210 detects the presence of the user by detecting a face area from the captured image to execute the HPD processing based on the detection result.

The person detection unit 210 detects the face area from the captured image captured by the imaging unit 120 to detect whether or not the user is present in front of the electronic apparatus 1. For example, when the user approaches the electronic apparatus 1, the person detection unit 210 changes the detection state from a state where the user is absent in front of the electronic apparatus 1 to a state where the user is present. Further, when the user is using the electronic apparatus 1 in front of the electronic apparatus 1, the person detection unit 210 is continuously detecting the state where the user is present in front of the electronic apparatus 1. Further, when the user has left the electronic apparatus 1, the person detection unit 210 changes the detection state from the state where the user is present in front of the electronic apparatus 1 to the state where the user is absent. Thus, the person detection unit 210 can detect whether or not the user is present in front of the electronic apparatus 1 to detect that the user has approached the electronic apparatus 1 (Approach), that the user is present in front of the electronic apparatus 1 (Presence), that the user has left the electronic apparatus 1 (Leave), that the user is absent in front of the electronic apparatus (Absence), or the like. The configuration of this person detection unit 210 will be described in detail later.

The operation control unit 220 controls the operating state of the system according to the HPD processing. For example, in the standby state, when a change from the state where the user is absent in front of the electronic apparatus 1 to the state where the user is present (that is, the approach of the user to the electronic apparatus 1) is detected by the person detection unit 210, the operation control unit 220 causes the system to make the transition from the standby state to the normal operating state. Specifically, when the approach of the user to the electronic apparatus 1 is detected by the person detection unit 210, the operation control unit 220 instructs the system processing unit 300 to boot the system. More specifically, when the system is booted, the operation control unit 220 outputs, to the power supply unit 400, a control signal to supply power necessary for the operation of each unit of the electronic apparatus 1. After that, the operation control unit 220 outputs a boot signal to the system processing unit 300 to instruct the system processing unit 300 to boot the system. When acquiring the boot signal, the system processing unit 300 boots the system to make the transition from the standby state to the normal operating state.

Further, when the state where the user is present in front of the electronic apparatus 1 is continuously being detected by the person detection unit 210, the operation control unit 220 causes the system processing unit 300 to restrict the system not to make a transition to the standby state so as to continue the normal operating state. However, even when the state where the user is present is continuously being detected by the person detection unit 210, the operation control unit 220 may make the transition from the normal operating state to the standby state depending on a predetermined condition. The predetermined condition is, for example, that the duration of non-operation has lasted for a preset period of time, that an operation to make the transition to the standby state is performed, or the like.

Further, in normal operation, when a change from the state where the user is present in front of the electronic apparatus 1 to the state where the user is absent (that is, the leave of the user from the electronic apparatus 1) is detected by the person detection unit 210, the operation control unit 220 instructs the system processing unit 300 to cause the system to make the transition from the normal operating state to the standby state. More specifically, the operation control unit 220 outputs, to the system processing unit 300, a standby signal to instruct the system processing unit 300 to cause the system to make the transition from the normal operating state to the standby state. When acquiring the standby signal, the system processing unit 300 causes the system to make the transition from the normal operating state to the standby state. After that, the operation control unit 220 outputs a control signal to the power supply unit 400 to stop the supply of power unnecessary in the standby state.

The system processing unit 300 is configured to include a CPU (Central Processing Unit) 302, a GPU (Graphic Processing Unit) 304, a memory controller 306, an I/O (Input-Output) controller 308, and a system memory 310, where processes of various application programs are executable on an OS (Operating System) by system processing based on the OS. The CPU 302 and the GPU 304 may be collectively called a processor.

The CPU 302 executes processing by the OS and processing by the application programs running on the OS. Further, the CPU 302 causes the operating state of the system to make a transition by the HPD processing executed by the EC 200. For example, when the operating state is the stopped state or the standby state, and the boot signal is input from the EC 200, the CPU 302 executes boot processing to make a transition from the stopped state or the standby state to the normal operating state. After completion of the boot processing, the CPU 302 starts the execution of system processing based on the OS. For example, when the operating state is the standby state and the boot signal is input from the EC 200, the CPU 302 resumes the execution of the application programs the execution of which is suspended.

In the boot processing, the CPU 302 executes login processing to determine whether to allow access to the OS or not. When the boot processing by the OS is started, the CPU 302 executes the login processing before allowing the access to the OS, and the transition to the normal operating state is paused until login is allowed in the login processing. In the login processing, user authentication processing is performed to determine whether or not a person using the electronic apparatus 1 is a preregistered, authorized user. As the authentication, there are password authentication, face authentication, fingerprint authentication, and the like. When the authentication result is successful, the CPU 302 allows the login and resumes the execution of the paused system processing. On the other hand, when the authentication result is unsuccessful, the CPU 302 does not allow the login and leaves the execution of the system processing paused.

The GPU 304 is connected to the display unit 110. The GPU 304 executes image processing under the control of the CPU 302 to generate display data. The GPU 304 outputs the generated display data to the display unit 110. Note that the CPU 302 and the GPU 304 may be integrally formed as one core, or the load may be shared between the CPU 302 and the GPU 304 formed as individual cores, respectively. The number of processors is not limited to one, and it may be plural.

The memory controller 306 controls reading data from and writing data to the system memory 310, the storage unit 360 and the like by the CPU 302 and the GPU 304.

The I/O controller 308 controls input/output of data from the communication unit 350, the display unit 110, and the EC 200.

The system memory 310 is used as a reading area of an execution program of the processor and a working area to write processed data. Further, the system memory 310 temporarily stores image data of a captured image(s) captured by the imaging unit 120.

The communication unit 350 is connected to other devices communicably through a wireless or wired communication network to transmit and receive various data. For example, the communication unit 350 is configured to include a wired LAN interface such as the Ethernet (registered trademark), a wireless LAN interface such as Wi-Fi (registered trademark), and the like.

The storage unit 360 is configured to include storage media, such as an HDD (Hard Disk Drive) or an SDD (Solid State Drive), a ROM, and the like. The storage unit 360 stores the OS, device drivers, various programs such as applications, and various data acquired by the operation of the programs.

[Configuration of Person Detection Unit]

Next, the configuration of the person detection unit 210 will be described in detail. The person detection unit 210 detects the user present in front of the electronic apparatus 1 by detecting face areas respectively from captured images captured by the imaging unit 120 at predetermined time intervals.

Figure 7:
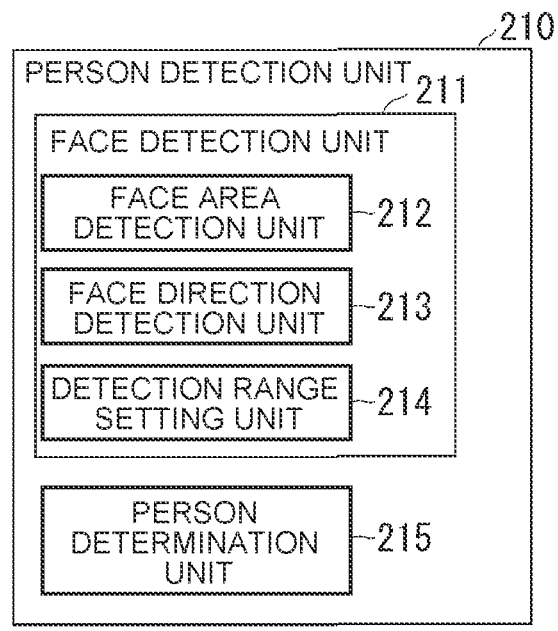
FIG. 7 is a block diagram illustrating an example of the configuration of a person detection unit according to the first embodiment.

FIG. 7 is a block diagram illustrating an example of the configuration of the person detection unit 210 according to the present embodiment. The person detection unit 210 illustrated includes a face detection unit 211 and a person determination unit 215. The face detection unit 211 includes a face area detection unit 212, a face direction detection unit 213, and a detection range setting unit 214 to perform the detection of a face and a face orientation respectively from each of captured images captured at the predetermined time intervals.

The face area detection unit 212 detects a face area with a face captured therein respectively from each of captured images captured at the predetermined time intervals. For example, the face detection unit 211 processes image data of plural images captured by the imaging unit 120 at the predetermined time intervals and stored in the system memory 310 to detect the face area with the face captured therein from among the plural images. As the face detection method, any detection method using a face detection algorithm to detect a face based on face feature information, trained data (learned model) subjected to machine learning based on face feature information, a face detection library, or the like can be applied. Further, for example, although the predetermined time intervals can be 15 second intervals or 10 second intervals, the predetermined time intervals can be set to any time intervals. In the case of the shortest time intervals, face areas in all consecutive frames are detected frame by frame. The face detection unit 211 detects face areas from respective captured images, and outputs the detected face areas or the center coordinates of the face areas. The face area detection unit 212 functions in both the first detection mode and the second detection mode.

The face direction detection unit 213 detects an orientation of the face detected by the face area detection unit 212. For example, the face direction detection unit 213 detects a face orientation (front face, side profile, or the like) based on the number and positions of detected facial features (eyes, nose, mouth, jaw, and the like). The face direction detection unit 213 functions only in the first detection mode, and does not function in the second detection mode.

The detection range setting unit 214 sets a detection range upon detecting a face from a captured image. For example, the detection range setting unit 214 sets a face detection range to the full range in the first detection mode and to the half range in the second detection mode.

The face detection unit 211 performs face detection processing using the first detection mode or the second detection mode by the functions of the face area detection unit 212, the face direction detection unit 213, and the detection range setting unit 214 described above. For example, in the normal operating state, the face detection unit 211 uses the first detection mode to perform the detection of a face and a face orientation from a captured image in the full range. Further, in the standby state, the face detection unit 211 uses the second detection mode to perform only the detection of a face from the captured image in the half range.

Based on whether or not a face area is detected from the captured image by the face detection unit 211, the person determination unit 215 determines whether or not the user is present in front of the electronic apparatus 1. For example, when a face area is detected from the captured image by the face detection unit 211, the person determination unit 215 determines that the user is present in front of the electronic apparatus 1. On the other hand, when any face area is not detected from the captured image by the face detection unit 211, the person determination unit 215 determines that the user is absent in front of the electronic apparatus 1. Note that even when a face area is detected from the captured image by the face detection unit 211, the person determination unit 215 may also determine whether or not there is motion in a face detected respectively from captured images captured at the predetermined time intervals to determine that the user is present when there is motion. When determining that there is no motion in the detected face, the person determination unit 215 may determine that the user is absent by regarding the face as a face in a poster or a photo.

With such a configuration, the person detection unit 210 detects the user present in front of the electronic apparatus 1. Further, the person detection unit 210 detects a change from the state where the user is absent in front of the electronic apparatus 1 to the state where the user is present (i.e., the approach of the user to the electronic apparatus 1) by detecting whether or not the user is present in front of the electronic apparatus 1. Further, the person detection unit 210 detects a change from the state where the user is present in front of the electronic apparatus 1 to the state where the user is absent (i.e., the leave of the user from the electronic apparatus 1) by detecting whether or not the user is present in front of the electronic apparatus 1.

Note that the person detection unit 210 may also detect plural persons in the normal operating state. The plural persons indicate the user and any person(s) other than the user. As described above, the person detection unit 210 may also detect any person other than the user, who is likely to peep in the normal operating state.

[Operation of HPD Processing]

Figure 8:
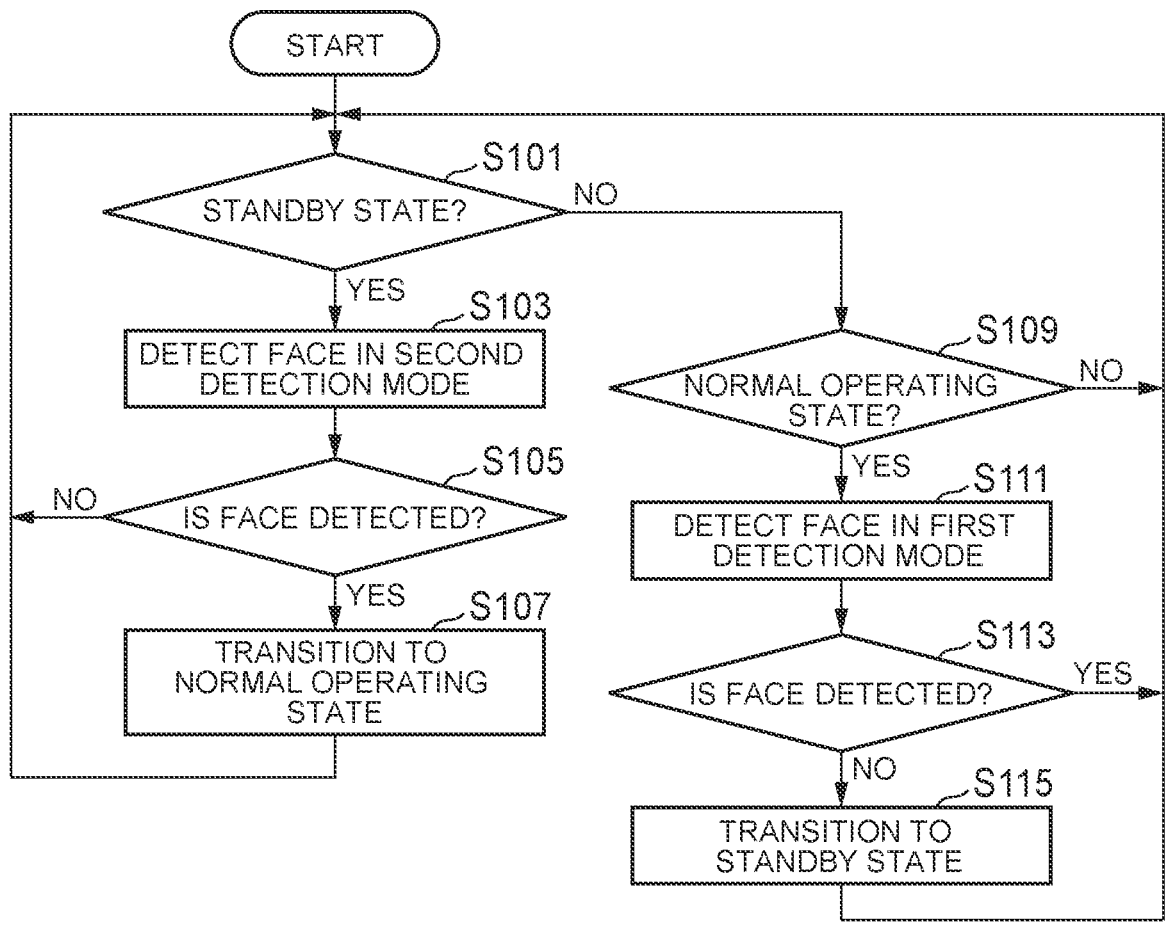
FIG. 8 is a flowchart illustrating an example of HPD processing according to the first embodiment.

Referring next to FIG. 8, the operation of HPD processing will be described.

FIG. 8 is a flowchart illustrating an example of HPD processing according to the present embodiment. Here, the operation of processing to make a transition between the standby state and the normal operating state by the HPD processing will be described.

(Step S101) The EC 200 determines whether or not the operating state of the system is the standby state. When the EC 200 determines that the operating state is the standby state (YES), the procedure proceeds to a process of step S103. On the other hand, when the EC 200 determines that the operating state is not the standby state (NO), the procedure proceeds to a process of step S109.

(Step S103) The person detection unit 210 detects a face area from a captured image in the second detection mode. Then, the procedure proceeds to a process of step S105.

(Step S105) The EC 200 determines whether or not a face area is detected in step S103. When the EC 200 determines that no face area is detected (NO), the procedure returns to the process of step S101. On the other hand, when the EC 200 determines that a face area is detected (YES), the procedure proceeds to a process of step S107.

(Step S107) Since the approach of the user (Approach) is detected in step S105, the EC 200 causes the operating state of the system to make the transition from the standby state to the normal operating state. Then, the procedure returns to the process of step S101.

(Step S109) The EC 200 determines whether or not the operating state of the system is the normal operating state. When the EC 200 determines that the operating state is the normal operating state (YES), the procedure proceeds to a process of step S111. On the other hand, when the EC 200 determines that the operating state is not the normal operating state (NO), the procedure returns to the process of step S101.

(Step S111) The person detection unit 210 detects a face area from a captured image in the first detection mode. Then, the procedure proceeds to a process of step S113.

(Step S113) The EC 200 determines whether or not a face area is detected in step S111. When determining that a face area is detected (YES), the EC 200 returns to the process of step S101. On the other hand, when determining that no face is detected (NO), the EC 200 proceeds to a process of step S115.

(Step S115) Since the leave of the user (Leave) is detected in step S113, the EC 200 causes the operating state of the system to make the transition from the normal operating state to the standby state. Then, the procedure returns to the process of step S101.

Summary of First Embodiment

As described above, the electronic apparatus 1 according to the present embodiment includes a processing unit which executes system processing based on the OS (an example of a system), the system memory 310 (an example of a memory) which temporarily stores image data of an image (captured image) captured by the imaging unit 120 (an example of an imaging device), the person detection unit 210 (an example of a processor) which processes image data stored in the system memory 310, and the operation control unit 220 which controls the operating state of the OS. The person detection unit 210 includes the face detection unit 211 which processes image data of a captured image obtained by the imaging unit 120 capturing a predetermined imaging range and stored in the system memory 310 to perform the detection of a face area with a face captured therein and the detection of a face orientation from the captured image. Further, according to the detection result by the face detection unit 211, the operation control unit 220 controls the operating state of the OS to the normal operating state (an example of a first operating state) or the standby state (an example of a second operating state) in which at least part of the system processing is more limited than the normal operating state. Then, in the normal operating state, the face detection unit 211 performs the detection of the face area and the face orientation from a full range (an example of a first detection range) in the image area of the captured image, while in the standby state, the face detection unit 211 performs the detection of the face area without performing the detection of the face orientation from a half range (an example of a second detection range) narrower than the full range in the image area of the captured image.

Thus, since the electronic apparatus 1 performs only the detection of the face area from a narrower detection range in the standby state, the face of a person other than the user, who is present around the user, can be prevented from being detected as the user by mistake while reducing power consumption during standby. On the other hand, the electronic apparatus 1 can detect the face of the user, the face of a person other than the user, who is present around the user, and the directions the user and the person are looking at from a wider detection range during normal operation. Therefore, according to the present embodiment, the user (a person using the electronic apparatus 1) can be detected accurately while ensuring detection performance as needed and reducing power consumption.

Further, when a face area is no longer detected from a state where the face area is detected by the face detection unit 211 in the normal operating state, the operation control unit 220 makes the transition to the standby state, while when a face area is detected from a state where no face area is detected by the face detection unit 211 in the standby state, the operation control unit 220 makes the transition to the normal operating state.

Thus, the electronic apparatus 1 can make a transition of the operating state of the system properly depending on whether the user is present or not. For example, since the electronic apparatus 1 is automatically booted and put in the usable operating state when the user has approached, it is convenient. Further, since the electronic apparatus 1 automatically makes the transition to the standby state when the user has left, power consumption can be reduced while ensuring security.

Further, a control method for the electronic apparatus 1 including the system memory 310 (the example of the memory) which temporarily stores image data of an image (captured image) captured by the imaging unit 120 (the example of the imaging device), and the person detection unit 210 (the example of the processor) which processes image data stored in the system memory 310, includes: a step of causing the system processing unit 300 (an example of a processing unit) to execute system processing based on an OS (the example of the system); a step of causing the operation control unit 220 to control the operating state of the OS; and a step of causing the face detection unit 211 in the person detection unit 210 to process image data of a captured image obtained by the imaging unit 120 capturing a predetermined imaging range and stored in the system memory 310 in order to perform the detection of a face area with a face captured therein and a face orientation from the captured image. Further, in the step in which the operation control unit 220 performs control, the operation control unit 220 controls the operating state of the OS to the normal operating state (the example of the first operating state) or the standby state (the example of the second operating state) in which at least part of the system processing is more limited than the normal operating state according to the detection result by the face detection unit 211. Then, in the step performed by the face detection unit 211, the face detection unit 211 performs the detection of the face area and the face orientation from the full range (the example of the first detection range) in the image area of the captured image in the normal operating state, and performs the detection of the face area without performing the detection of the face orientation from the half range (the example of the second detection range) narrower than the full range in the image area of the captured image in the standby state.

Thus, since the electronic apparatus 1 performs only the detection of the face area from the narrower detection range in the standby state, the face of a person other than the user, who is present around the user, can be prevented from being detected as the user by mistake while reducing power consumption during standby. On the other hand, the electronic apparatus 1 can detect the face of the user, the face of a person other than the user, who is present around the user, and the directions the user and the person are looking at from the wider detection range during normal operation. Therefore, according to the present embodiment, the user (the person using the electronic apparatus 1) can be detected accurately while ensuring detection performance as needed and reducing power consumption.

Second Embodiment

Next, a second embodiment of the present invention will be described.

In the first embodiment, using the first detection mode to detect a face area and a face orientation from the full range in the normal operating state is described. In this embodiment, switching to the second detection mode when a side profile is detected even in the normal operating state will be described.

Since the basic configuration of the electronic apparatus 1 according to this embodiment is the same as the configuration according to the first embodiment illustrated in FIG. 5 to FIG. 7, the description thereof will be omitted. Here, characteristic processing of the present embodiment will be described. In the normal operating state, when the face orientation detected in the first detection mode is a side profile, the face detection unit 211 switches to the second detection mode. For example, there is a case where an external display is connected to the electronic apparatus 1 as a second display and the user uses the second display as the main display. In this case, a side profile of the user is in a captured image of the electronic apparatus 1 placed next to the user. For example, since peeping cannot be detected in the captured image from the side of the user, there is no need to stay in the first detection mode. Therefore, the electronic apparatus 1 switches to the second detection mode to perform only the detection of a face area in the half range in order to detect the leave of a person. This avoids wasted power consumption. For example, when the face orientation detected in the normal operating state is a side profile, the face detection unit 211 stops the detection of the face orientation, and switches to the second detection mode in which only the detection of a face area in the half range is performed.

Figure 9:
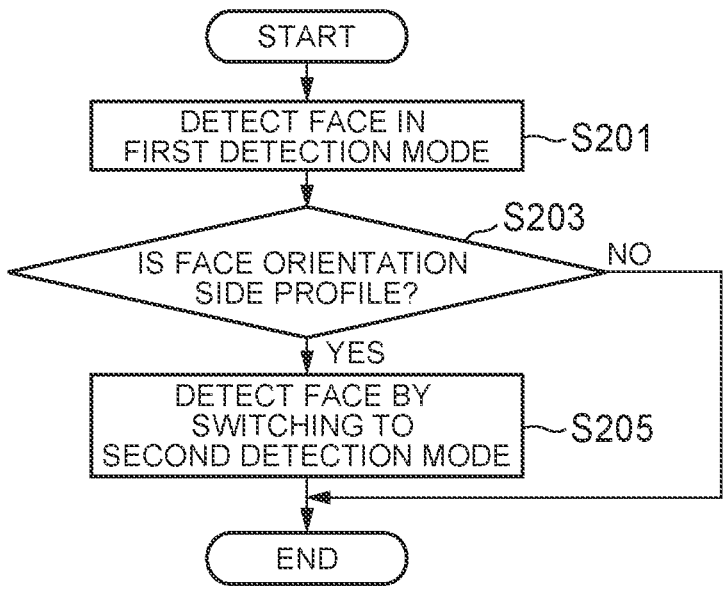
FIG. 9 is a flowchart illustrating an example of detection mode switching processing in the normal operating state according to a second embodiment.

FIG. 9 is a flowchart illustrating an example of detection mode switching processing in the normal operating state according to the present embodiment.

(Step S201) The person detection unit 210 detects a face area from a captured image in the first detection mode. Then, the person detection unit 210 proceeds to a process of step S203.

(Step S203) The person detection unit 210 determines whether or not a face orientation detected in step S201 is a side profile. When determining that the face orientation is a side profile (YES), the person detection unit 210 proceeds to a process of step S205. On the other hand, when determining that the face orientation is not a side profile but a front face (NO), the person detection unit 210 ends the processing without switching the detection mode.

(Step S205) The person detection unit 210 switches to the second detection mode to perform the detection of a face area.

Note that this detection mode switching processing is repeatedly executed while face detection in the first detection mode is being performed in the normal operating state. Further, after switching to the second detection mode, face detection in the first detection mode is temporarily performed in a predetermined cycle, and when the front face is detected, the detection mode is returned to the first detection mode.

Although the person detection unit 210 stops the detection of a face orientation when the face orientation detected in the normal operating state is a side profile, the detection of a face area may also be performed in the full range without changing the detection range.

Summary of Second Embodiment

As described above, the electronic apparatus 1 according to the present embodiment stops the detection of a face orientation when the face orientation detected in the normal operating state (the example of the first operating state) is a side profile.

Thus, the electronic apparatus 1 can reduce power consumption according to the usage situation even in the normal operating state.

Further, when the face orientation detected in the normal operating state is a side profile, the electronic apparatus 1 switches the detection range upon performing the detection of a face area to the half range (the example of the second detection range).

Thus, the electronic apparatus 1 can reduce power consumption according to the usage situation even in the normal operating state.

Third Embodiment

Next, a third embodiment of the present invention will be described.

In the second embodiment, switching to the second detection mode when a side profile is detected in the normal operating state is described, but switching to the second detection mode may also be done when an external display is connected.

Figure 10:
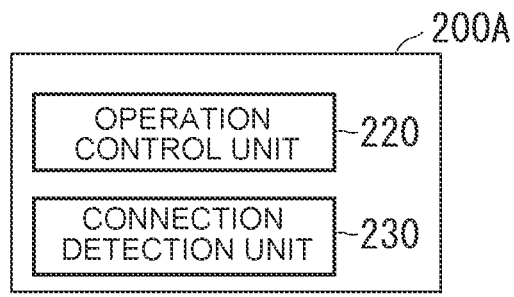
FIG. 10 is a block diagram illustrating an example of the configuration of an EC according to a third embodiment.

FIG. 10 is a block diagram illustrating an example of the configuration of an EC 200A according to this embodiment. The EC 200A according to the present embodiment is different from the EC 200 illustrated in FIG. 6 in that the EC 200A further includes a connection detection unit 230 to detect the connection of an external display. The connection detection unit 230 detects whether or not an external display is connected to the video output terminal 160. When the connection with the external display is detected by the connection detection unit 230 in the normal operating state, the face detection unit 211 stops the detection of a face orientation, and switches to the second detection mode to perform only the detection of a face area in the half range.

Figure 11:
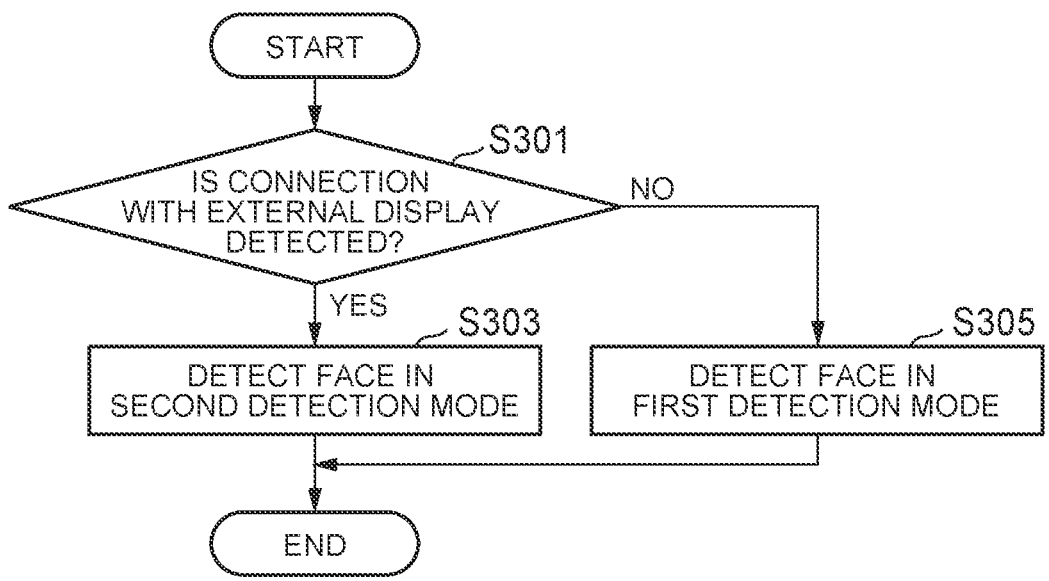
FIG. 11 is a flowchart illustrating an example of detection mode switching processing in the normal operating state according to the third embodiment.

FIG. 11 is a flowchart illustrating detection mode switching processing in the normal operating state according to the present embodiment.

(Step S301) the EC 200A determines whether or not the connection with an external display is detected. When the EC 200A determines that the connection with an external display is detected (YES), the procedure proceeds to a process of step S303. On the other hand, when the EC 200A determines that the connection with an external display is not detected (NO), the procedure proceeds to a process of step S305.

(Step S303) The person detection unit 210 detects a face area from a captured image in the second detection mode.

(Step S305) The person detection unit 210 detects a face area from a captured image in the first detection mode.

Although the person detection unit 210 stops the detection of a face orientation when the connection with an external display is detected, the person detection unit 210 may also perform the detection of a face area in the full range without changing the detection range.

Summary of Third Embodiment

As described above, the electronic apparatus 1 according to the present embodiment further includes the connection detection unit 230 to detect the connection with an external display. Then, when the connection with an external display is detected by the connection detection unit 230 in the normal operating state (the example of the first operating state), the electronic apparatus 1 stops the detection of a face orientation.

Thus, the electronic apparatus 1 can reduce power consumption according to the usage situation even in the normal operating state.

Further, when the connection with an external display is detected by the connection detection unit 230, the electronic apparatus 1 switches the detection range upon performing the detection of a face area to the half range (the example of the second detection range).

Thus, the electronic apparatus 1 can reduce power consumption according to the usage situation even in the normal operating state.

Note that the electronic apparatus 1 may also stop the detection of a face orientation based on a user's instruction in the normal operating state. For example, this user's instruction is that the user performs an operation to turn off the function of detecting peeping (Shoulder surfing). Further, in the normal operating state, the electronic apparatus 1 may also switch the detection range upon performing the detection of a face area to the half range (the example of the second detection range) based on a user's instruction. In other words, in the normal operating state, the electronic apparatus 1 may switch from the first detection mode to the second detection mode based on the user's instruction.

Thus, the electronic apparatus 1 can reduce power consumption according to the usage situation even in the normal operating state.

Further, when switching from the first detection mode to the second detection mode is done in the normal operating state, the electronic apparatus 1 may also return the detection mode from the second detection mode to the first detection mode based on a user's instruction. For example, this user's instruction is that the user performs an operation to turn on the function of detecting peeping (Shoulder surfing).

Thus, the electronic apparatus 1 can improve the function of detecting a face area as needed in the normal operating state.

Fourth Embodiment

Next, a fourth embodiment of the present invention will be described.

In this embodiment, reducing the brightness of the display unit 110 when a side profile is detected in the normal operating state will be described. When a side profile is detected, it is considered that the user is using the second display as the main display as described in the second embodiment. Since the user does not look at the display unit 110 of the electronic apparatus 1, power consumption can be reduced by reducing the brightness of the display unit 110.

Figure 12:
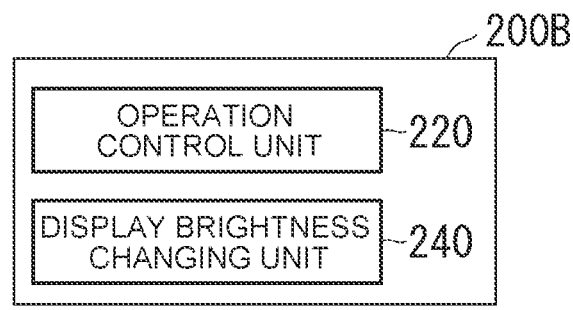
FIG. 12 is a block diagram illustrating an example of the configuration of an EC according to a fourth embodiment.

FIG. 12 is a block diagram illustrating an example of the configuration of an EC 200B according to the present embodiment. The EC 200B according to the present embodiment is different from the EC 200 illustrated in FIG. 6 in that the EC 200B further includes a display brightness changing unit 240. When the face orientation detected by the face detection unit 211 in the normal operating state is a side profile, the display brightness changing unit 240 reduces the brightness of the display unit 110 from a set value. The set value is a set value for the brightness volume of the display unit 110, which is a brightness value set by the user or a default brightness value. When reducing the brightness of the display unit 110 from the set value, the display brightness changing unit 240 may reduce the brightness of the display unit 110 by a preset reduced amount from the set value, or change the brightness thereof to a preset lower brightness value.

Figure 13:
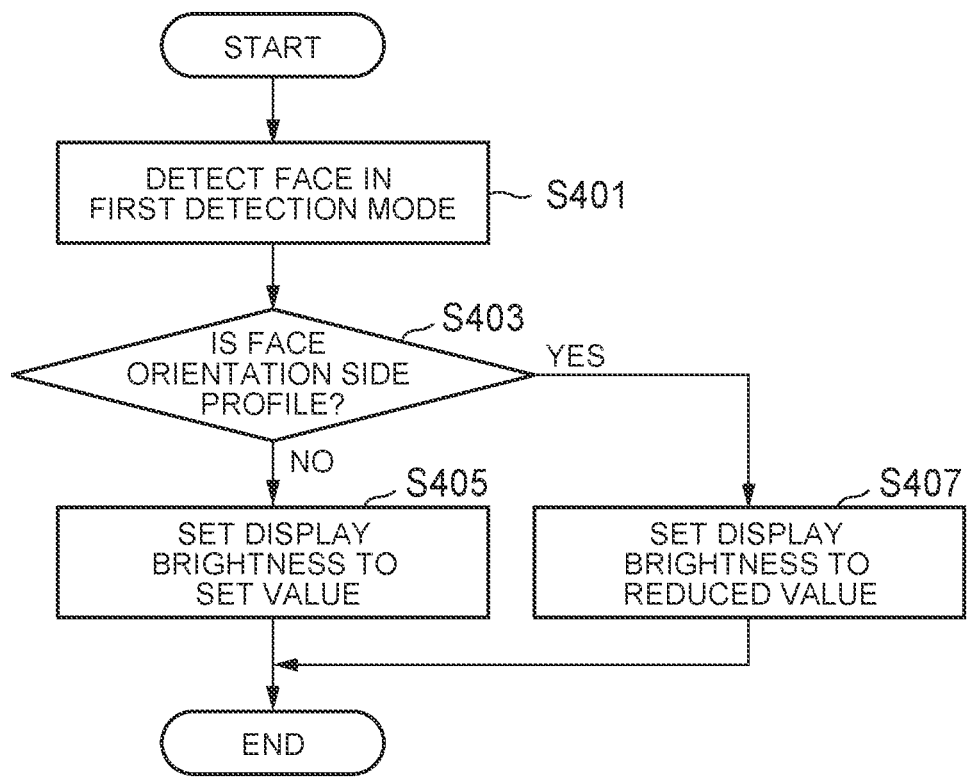
FIG. 13 is a flowchart illustrating an example of display brightness control processing in the normal operating state according to the fourth embodiment.

FIG. 13 is a flowchart illustrating an example of display brightness control processing in the normal operating state according to the present embodiment.

(Step S401) The person detection unit 210 detects a face area from a captured image in the first detection mode. Then, the procedure proceeds to a process of step S403.

(Step S403) The EC 200B determines whether or not the orientation of a face detected in step S401 is a side profile. When determining that the face orientation is not a side profile but a front face (NO), the EC 200B proceeds to a process of step S405. On the other hand, when determining that the face orientation is a side profile (YES), the EC 200B proceeds to a process of step S407.

(Step S405) The EC 200B sets the brightness of the display unit 110 to the set value.

(Step S407) The EC 200B sets the brightness of the display unit 110 to a value reduced from the set value.

Summary of Fourth Embodiment

As described above, the electronic apparatus 1 according to the present embodiment reduces the brightness of the display unit 110 from the set value when the face orientation detected in the normal operating state (the example of the first operating state) is a side profile.

Thus, the electronic apparatus 1 can reduce power consumption according to the usage situation even in the normal operating state.

Fifth Embodiment

Next, a fifth embodiment of the present invention will be described.

In this embodiment, reducing the brightness of the display unit 110 when an external display is connected in the normal operating state will be described. As described in the second embodiment, it is considered that the user is using the external display (second display) as the main display. Since the user does not look at the display unit 110 of the electronic apparatus 1, power consumption can be reduced by reducing the brightness thereof.

Figure 14:
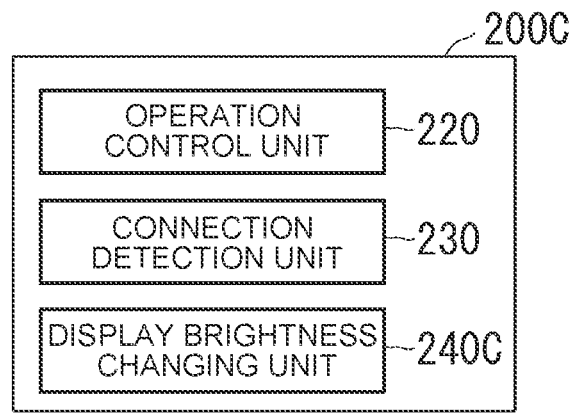
FIG. 14 is a block diagram illustrating an example of the configuration of an EC according to a fifth embodiment.

FIG. 14 is a block diagram illustrating an example of the configuration of an EC 200C according to the present embodiment. The EC 200C according to the present embodiment is different from the EC 200 illustrated in FIG. 6 in that the EC 200C further includes the connection detection unit 230 and a display brightness changing unit 240C. The connection detection unit 230 corresponds to the connection detection unit 230 illustrated in FIG. 10 to detect whether or not an external display is connected to the video output terminal 160. The display brightness changing unit 240C is different from the display brightness changing unit 240 illustrated in FIG. 12 in the trigger when reducing the brightness of the display unit 110 from the set value. When the connection with an external display is detected by the connection detection unit 230 in the normal operating state, the display brightness changing unit 240C reduces the brightness of the display unit 110 from the set value. As described in the fourth embodiment, the set value is a set value for the brightness volume of the display unit 110, which is a brightness value set by the user or a default brightness value. When reducing the brightness of the display unit 110 from the set value, the display brightness changing unit 240C may reduce the brightness of the display unit 110 by a preset reduced amount from the set value, or change the brightness thereof to a preset lower brightness value.

Figure 15:
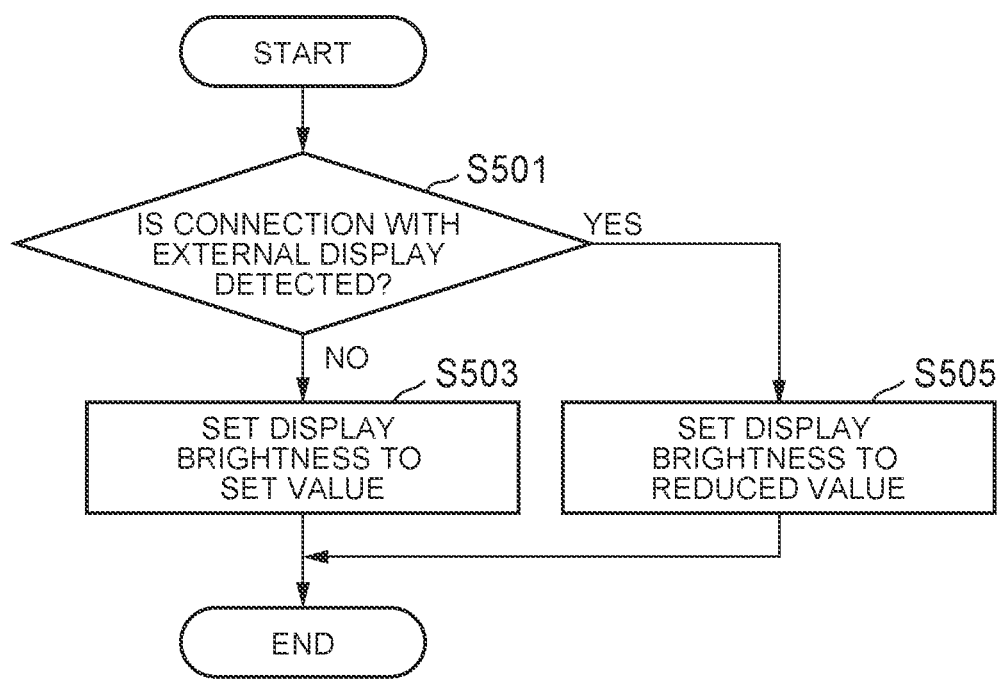
FIG. 15 is a flowchart illustrating an example of display brightness control processing in the normal operating state according to the fifth embodiment.

FIG. 15 is a flowchart illustrating an example of display brightness control processing in the normal operating state according to the present embodiment.

(Step S501) The EC 200C determines whether or not the connection with an external display is detected. When determining that the connection with an external display is detected (YES), the EC 200C proceeds to a process of step S503. On the other hand, when determining that the connection with an external display is not detected (NO), the EC 200C proceeds to a process of step S505.

(Step S503) The EC 200C sets the brightness of the display unit 110 to the set value.

(Step S505) The EC 200C sets the brightness of the display unit 110 to a value reduced from the set value.

Summary of Fifth Embodiment

As described above, the electronic apparatus 1 according to the present embodiment includes the connection detection unit 230 to detect the connection with an external display. Then, when the connection with an external display is detected by the connection detection unit 230 in the normal operating state (the example of the first operating state), the electronic apparatus 1 reduces the brightness of the display unit 110 from the set value.

Thus, the electronic apparatus 1 can reduce power consumption according to the usage situation even in the normal operating state.

While the respective embodiments of this invention have been described in detail above with reference to the accompanying drawings, the specific configurations are not limited to the above-described embodiments, and design changes are included without departing from the scope of this invention. For example, the respective configurations described in the respective embodiments described above can be combined arbitrarily.

Further, in the aforementioned embodiments, the example in which the imaging unit 120 is built in the electronic apparatus 1 is illustrated, but the present invention is not limited to this example. For example, the imaging unit 120 does not have to be built in the electronic apparatus 1, which may also be attachable to the electronic apparatus 1 (for example, onto any of the side faces 10a, 10b, 10c, and the like) and communicably connected to the electronic apparatus 1 wirelessly or by wire as an external accessory of the electronic apparatus 1.

Further, in the aforementioned embodiments, the electronic apparatus 1 detects a face area with a face captured therein from a captured image to detect the presence of the user, but the detection target is not limited to the face, and the presence of the user may also be detected by detecting an area in which at least part of the body is captured. Further, the electronic apparatus 1 may use a distance sensor (for example, a proximity sensor or the like) together to detect the distance to an object. For example, the distance sensor is provided on the inner face side of the first chassis 10 to detect an object (for example, a person) present within a detection range in a direction (forward) to face the inner face of the first chassis 10. As an example, the distance sensor may be an infrared distance sensor configured to include a light-emitting part for emitting infrared light and a light-receiving part for receiving reflected light which is the infrared light returned after being emitted and reflected on the surface of the object. Note that the distance sensor may be a sensor using infrared light emitted by a light-emitting diode, or a sensor using an infrared laser emitting a light beam narrower in wavelength band than the infrared light emitted by the light-emitting diode. Further, the distance sensor is not limited to the infrared distance sensor, and it may be a sensor using any other method, such as an ultrasonic sensor or a sensor using an UWB (Ultra Wide Band) radar, as long as the sensor detects the distance to the object. Further, the distance sensor does not have to be built in the electronic apparatus 1, which may also be attachable to the electronic apparatus 1 (for example, onto any of the side faces 10*a*, 10*b*, 10*c*, and the like) and communicably connected to the electronic apparatus 1 wirelessly or by wire as an external accessory of the electronic apparatus 1. Further, the imaging unit 120 and the distance sensor may be integrally constructed.

Further, in the aforementioned embodiments, the examples in which the person detection unit 210 is provided separately from the EC 200, the EC 200A, the EC 200B, and the EC 200C are illustrated, but some or all of the functions of the person detection unit 210 may be provided in the EC 200, the EC 200A, the EC 200B, and the EC 200C. The person detection unit 210 may also be provided in the system processing unit 300. Further, in the first embodiment mentioned above, the example in which the EC 200 includes the operation control unit 220 is illustrated, but some or all of the functions of the operation control unit 220 may be provided in any processing unit (for example, the system processing unit 300) other than the EC 200. Further, in the third embodiment mentioned above, the example in which the EC 200A includes the operation control unit 220 and the connection detection unit 230 is illustrated, but some or all of the functions of the operation control unit 220 and the connection detection unit 230 may be provided in any processing unit (for example, the system processing unit 300) other than the EC 200A. Further, in the fourth embodiment mentioned above, the example in which the EC 200B includes the operation control unit 220 and the display brightness changing unit 240 is illustrated, but some or all of the functions of the operation control unit 220 and the display brightness changing unit 240 may be provided in any processing unit (for example, the system processing unit 300) other than the EC 200B. Further, in the fifth embodiment mentioned above, the example in which the EC 200C includes the operation control unit 220, the connection detection unit 230, and the display brightness changing unit 240C is illustrated, but some or all of the functions of the operation control unit 220, the connection detection unit 230, and the display brightness changing unit 240C may be provided in any processing unit (for example, the system processing unit 300) other than the EC 200C.

Further, in the aforementioned embodiments, the EC 200 (EC 200A, EC 200B, EC 200C) operating independently of the system processing unit 300 may be any processing unit such as a sensor hub or a chipset, and the above-described processing may be executed by any processing unit other than the EC 200 (EC 200A, EC 200B, EC 200C) instead of the EC 200 (EC 200A, EC 200B, EC 200C).

Further, the standby state described above may also include a state in which at least the display of the display unit appears to be OFF (screen OFF) or a screen lock state. The screen lock is a state in which an image preset to make a processed content invisible (for example, an image for the screen lock) is displayed on the display unit, that is, an unusable state until the lock is released (for example, user authentication).

Note that the electronic apparatus 1 described above has a computer system therein. Then, a program for implementing the function of each component included in the electronic apparatus 1 described above may be recorded on a computer-readable recording medium so that the program recorded on this recording medium is read into the computer system and executed to perform processing in each component included in the electronic apparatus 1 described above. Here, the fact that "the program recorded on the recording medium is read into the computer system and executed" includes installing the program on the computer system. It is assumed that the "computer system" here includes the OS and hardware such as peripheral devices and the like. Further, the "computer system" may also include two or more computers connected through networks including the Internet, WAN, LAN, and a communication line such as a dedicated line. Further, the "computer-readable recording medium" means a storage medium such as a flexible disk, a magneto-optical disk, a ROM, a portable medium like a CD-ROM, or a hard disk incorporated in the computer system. The recording medium with the program stored thereon may be a non-transitory recording medium such as the CD-ROM.

Further, a recording medium internally or externally provided to be accessible from a delivery server for delivering the program is included as the recording medium. Note that the program may be divided into plural pieces, downloaded at different timings, respectively, and then united in each component included in the electronic apparatus 1, or delivery servers for delivering respective divided pieces of the program may be different from one another. Further, it is assumed that the "computer-readable recording medium" includes a medium on which the program is held for a given length of time, such as a volatile memory (RAM) inside a computer system as a server or a client when the program is transmitted through a network. The above-mentioned program may also be to implement some of the functions described above. Further, the program may be a so-called differential file (differential program) capable of implementing the above-described functions in combination with a program(s) already recorded in the computer system.

Further, some or all of the functions of the electronic apparatus 1 in the above-described embodiments may be realized as an integrated circuit such as LSI (Large Scale Integration). Each function may be implemented by a processor individually, or some or all of the functions may be integrated as a processor. Further, the method of circuit integration is not limited to LSI, and it may be realized by a dedicated circuit or a general-purpose processor. Further, if integrated circuit technology replacing the LSI appears with the progress of semiconductor technology, an integrated circuit according to the technology may be used.

Further, the electronic apparatus 1 in the above-described embodiments is not limited to a PC, a tablet terminal, or a smartphone, and the present invention can also be applied to a household electric appliance or a commercial electric appliance. As the household electric appliance, the present invention can be applied to a TV set, a refrigerator or a microwave oven having a display unit, or the like. For example, ON/OFF of a TV screen or ON/OFF of a screen of the display unit of the refrigerator or the microwave oven can be controlled in response to the approach or leave of a person. As the commercial electric appliance, the present invention can be applied to a vending machine, a multimedia station, or the like. For example, an operating state such as ON/OFF of lighting of the vending machine or ON/OFF of a screen of a display unit of the multimedia station can be controlled in response to the approach or leave of a person.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

DESCRIPTION OF SYMBOLS 1 electronic apparatus
10 first chassis
20 second chassis
15 hinge mechanism
110 display unit
120 imaging unit
130 acceleration sensor
140 power button
160 video output terminal
150 input device
151 keyboard
153 touch pad
200, 200A, 200B, 200C EC
210 person detection unit
211 face detection unit
212 face area detection unit
213 face direction detection unit
214 detection range setting unit
215 person determination unit
220 operation control unit
230 connection detection unit
240, 240C display brightness changing unit
300 system processing unit
302 CPU
304 GPU
306 memory controller
308 I/O controller
310 system memory
350 communication unit
360 storage unit
400 power supply unit

The invention claimed is:

1. An electronic apparatus comprising:
a processing unit which executes system processing based on a system;
a memory which temporarily stores image data of an image captured by an imaging device;
a processor which processes image data of an image obtained by the imaging device capturing a predetermined imaging range and stored in the memory to perform detection of a face area with a face captured therein and an orientation of the face from the image; and
an operation control unit which controls, according to a detection result by the processor, an operating state of the system to be a first operating state or a second operating state in which at least part of the system processing is more limited than the first operating state, wherein
the processor:
sets a first detection range and a second detection range in an image area of the image, wherein the second detection range is a range surrounded by a frame with a predetermined width and length in a horizontal and vertical direction from a canter of the image area and narrower than the first detection range in the horizontal and vertical direction,
in the first operating state, performs the detection of the face area and the face orientation from the first detection range, and
in the second operating state, performs the detection of the face area without performing the detection of the face orientation from the second detection range.

2. The electronic apparatus according to claim 1, wherein when the face area is no longer detected from a state where the face area is detected by the processor in the first operating state, the operation control unit makes a transition to the second operating state, while when the face area is detected from a state where the face area is not detected by the processor in the second operating state, the operation control unit makes a transition to the first operating state.

3. The electronic apparatus according to claim 1, wherein when the face orientation detected in the first operating state is a side profile, the processor stops the detection of the face orientation.

4. The electronic apparatus according to claim 3, wherein when the face orientation detected in the first operating state is a side profile, the processor switches a detection range upon performing the detection of the face to the second detection range.

5. The electronic apparatus according to claim 1, further comprising
a display brightness changing unit which, when the face orientation detected by the processor in the first operating state is a side profile, reduces the brightness of a display unit from a set value.

6. The electronic apparatus according to claim 1, further comprising
a connection detection unit which detects connection with an external display,
wherein when the connection with the external display is detected by the connection detection unit in the first operating state, the processor stops the detection of the face orientation.

7. The electronic apparatus according to claim 6, wherein when the connection with the external display is detected by the connection detection unit in the first operating state, the processor switches a detection range upon performing the detection of the face area to the second detection range.

8. The electronic apparatus according to claim 6, further comprising a display brightness changing unit which, when the connection with the external display is detected by the connection detection unit in the first operating state, reduces brightness of a display unit from a set value.

9. The electronic apparatus according to claim 1, wherein the processor stops the detection of the face orientation based on a user's instruction in the first operating state.

10. The electronic apparatus according to claim 9, wherein the processor switches a detection range upon performing the detection of the face to the second detection range based on a user's instruction in the first operating state.

11. A control method for an electronic apparatus including a memory which temporarily stores image data of an image captured by an imaging device, and a processor which processes image data stored in the memory, the control method comprising:
- a step of causing a processing unit to execute system processing based on a system;
- a step of causing an operation control unit to control an operating state of the system; and
- a step of causing the processor to process image data of an image obtained by the imaging device capturing a predetermined imaging range and stored in the memory to detect, from the image, a face area with a face captured therein and an orientation of the face, wherein in the step in which the operation control unit performs control, the operation control unit controls, according to a detection result by the processor, the operating state of the system to be a first operating state or a second operating state in which at least part of the system processing is more limited than the first operating state, and in the step performed by the processor, the processor:
- sets a first detection range and a second detection range in an image area of the image, wherein the second detection range is a range surrounded by a frame with a predetermined width and length in a horizontal and vertical direction from a canter of the image area and narrower than the first detection range in the horizontal and vertical direction,
- in the first operating state, performs the detection of the face area and the face orientation from the first detection range, and
- in the second operating state, performs the detection of the face area without performing the detection of the face orientation from the second detection range.

* * * * *